United States Patent [19]

Baraban et al.

[11] Patent Number: 4,700,288
[45] Date of Patent: Oct. 13, 1987

[54] AUTONOMOUS INVERTER

[76] Inventors: Viktor P. Baraban, ulitsa Systra, 4, kv. 48, Tallin; Stanislav G. Zabrovsky, Nemansky, proezd, 11, kv. 70, Moscow; Albert F. Zvyagin, ulitsa Kuldnoka, 15, kv. 85, Tallin; Grigory B. Lazarev, ulitsa Azovskaya 25, korpus 1, kv. 64, Moscow, all of U.S.S.R.

[21] Appl. No.: 903,563
[22] PCT Filed: Dec. 20, 1984
[86] PCT No.: PCT/SU84/00072
  § 371 Date: Aug. 11, 1986
  § 102(e) Date: Aug. 11, 1986
[87] PCT Pub. No.: WO86/03903
  PCT Pub. Date: Jul. 3, 1986
[51] Int. Cl.⁴ ................. H02M 7/521; H02M 1/06
[52] U.S. Cl. ............................... 363/138; 363/96
[58] Field of Search ............ 363/58, 96, 136–138; 318/802, 803, 810

[56] References Cited
U.S. PATENT DOCUMENTS

| 3,656,047 | 1/1972 | Borg | 307/252 K |
| 4,183,081 | 1/1980 | Cutler et al. | 363/58 |
| 4,255,783 | 3/1981 | Messer | 363/96 |
| 4,317,166 | 9/1982 | Praha et al. | 363/138 |

FOREIGN PATENT DOCUMENTS

| 1638551 | 5/1975 | Fed. Rep. of Germany . | |
| 2406338 | 5/1979 | France . | |
| 5731 | 1/1978 | Japan | 363/58 |
| 38523 | 3/1979 | Japan | 363/58 |
| 505099 | 2/1976 | U.S.S.R. . | |
| 489184 | 2/1976 | U.S.S.R. . | |
| 811460 | 3/1981 | U.S.S.R. | 363/137 |
| 964924 | 10/1982 | U.S.S.R. | 363/137 |

Primary Examiner—William H. Beha, Jr.
Attorney, Agent, or Firm—Lilling & Greenspan

[57] ABSTRACT

An autonomous inverter includes a three-phase thyristor bridge (7), a diode bridge (14), commutating capacitors (15), and communicating thyristors (16 and 17). AC leads of the thyristor bridge (7) are connected, via the commutating capacitors (15), to respective leads of the diode bridge (14). DC leads of the diode bridge (14) are connected to the like leads of the thyristor bridge (7) via the commutating thyristors (16 and 17). A master oscillator (24) of the autonomous inverter has the output thereof connected to a first input of a distributing unit (23). The autonomous inverter is also provided with two voltage dividers (18), the first arms of each divider (18) comprising three star-connected resistors (19), while the second arms thereof comprise resistors (20) inserted between the neutral points of the stars and the ground. Outputs of the voltage dividers (18) are connected to inverting and non-inverting inputs of a differential amplifier (21). The output of the differential amplifier (21) is connected to a second input of the distributing unit (23) via a hysteresis-type threshold element (22).

1 Claim, 2 Drawing Figures

AUTONOMOUS INVERTER

BACKGROUND OF THE INVENTION

1. Field of the Invention

This invention relates to power converters and, in particular, to autonomous inverters.

2. Description of the Prior Art

At present, adjustable electric drives equipped with autonomous inverters are extensively used in many technical fields. They substantially simplify the kinematics of machines and mechanisms, eliminate reduction gears, combine the electric drive and the mechanism into an integrated device, make the technilogical process fully automatic, and maintain desired optimal conditions of the mechanism with high speed and accuracy.

The circuitry of an autonomous inverter, which is one of the basic components of a thyristor frequency changer, largely determines the adjusting characteristics and power performance of the electric drive, as well as its weight, size, cost, and reliability. The latter considerations often dictate the choice of a particular circuit in preference to others, when selecting an autonoumous inverter for a high-power, high-voltage frequency converter. Many autonomous inverters are rejected for purely practical reasons.

In this connection it is a serious problem to provide autonomous inverters which are structurally uncomplicated, functionally reliable to provide improved commutation stability, and have better power performance. They should be smaller in size, lighter in weight, and less costly to manufacture. The problem is especially applicable to autonomous inverters for high-voltage frequency-adjustable electric drives wherein addition of extra gates and capacitors is impractical.

Known in the art is an autonomous inverter (cf., for example, USSR Inventor's Cetrificate No. 505,099 Cl. H02 m 5/42, H02 m 7/472) which is designed for induction motor control. In order to improve commutation stability and ensure faultless starting, this autonomous inverter, comprising thyristor switches, a differential-transformer control transducer whose primary winding is inserted into the circuit composed of a capacitor and one of the thyristor switches, is provided with additional threshold limiters whose inputs are connected to the transducer secondary winding. Outputs of the limiters are connected to inputs of a step phase shifter, the input of the master oscillator is connected to output lines of the autonomous inverter, while the output thereof is connected to the input of the step phase shifter.

The threshold limiters are adjusted to one level of the signal of the differential-transformer transducer in order to maintain the amplitude of the voltage across the switching capacitors constant in all conditions of the autonomous inverter and improve its commutation stability.

This autonomous inverter is deficient in that the switching capacitors are not isolated from the load during the intervals between switchings, and energy-exchange oscillating processes of persistent nature exist between the leakage induction motor of the switching capacitors. This results in distortion of the shape of the output voltage of the autonomous inverter by harmonics. Moreover, a direct component may appear on the switching capacitors of this autonomous inverter, which results in the asymmetry of the restoration angles of the switch thyristors and, consequently, in worse commutation stability. Any control assymetry leads to the voltage direct component appearing on the capacitors due to the presence of the transformer in the control transducer, through which information on the direct component cannot be transmitted.

Also known in the art is an autonomous inverter (cf., for example, W. Echner, D. Köllensperger, "Einrichtung zur Zwangskommutierung für eine Anordnung zur Steuerung der Drehzahl und Drehrichtung einer Drehstrommaschine", Siemens AG, FRG Patent No. 1638551, Cl. H02P 7/62, filed Feb. 17, 1967, published May 28, 1975) comprising a main bridge thyristor switch, switching capacitors, and an additional thyristor bridge switch.

In order to improve commutation stability, each switching capacitor is provided with a charging device comprising a transformer, a choke, capacitors, and thyristors. The inverter possesses good commutation stability due to the reliable recharging of the switching capacitors by the beginning of each next switching period. Since the commutating capacitors are isolated, in each switching interval, from the load (induction motor), no serious distortion of the shape of the output voltage by harmonics takes place. But this autonomous inverter has the disadvantage that the voltages applied to the thyristors of the additional bridge switch, during current commutation from one phase of the induction motor to another, are twice as large as those applied to the thyristors of the main thyristor bridge switch. To cope with this problem, thyristors of the additional switch should be rated for higher voltage or series-connected thyristors should be used. Both solutions make the inverter more expensive, heavier, and larger, particularly in high-voltage applications.

This autonomous inverter is not sufficiently reliable because it is composed of a large number of components which are functionally connected in a sequential arrangement.

Also known in the art is an autonomous inverter (cf., for example, USSR Inventor's Cetrificate No. 811,460 Cl.H02 m 7/515) comprising two commutating thyristors and an m-phase thyristor bridge whose a.c. leads are connected, via commutating capacitors, to respective a.c. leads of an auxiliary m-phase diode bridge, while d.c. leads of the diode bridge are connected with the like d.c. leads of the thyristor bridge via the commutating thyristors coupled with diodes in an aiding connection. Thyristors of the autonomous inverteer are controlled by a master oscillator whose output is connected to an input of a distribution unit which distributes control pulses to respective thyristors. A damping resistor is connected to the d.c. leads of the auxiliary diode bridge, which are coupled with the like d.c. leads of the thyristor bridge via the commutating thyristors which are in aiding connection with the diodes, in order to improve the commutation stability of the autonomous inverter and reduce the commutation surges on the inverter load. The commutation stability is improved, and voltage surges are limited due to damping the oscillating processes during current commutation. This is achieved by selecting resistors which have a resistance equal to 0.6–0.8 of the characteristic impedance of the circuit comprising a commutating capacitor and load phase inductors.

But the autonomous inverter is deficient in that its efficiency is affected by the losses in the damping resistor selected in accordance with the conditions described above. The losses can be substantially reduced when the resistance of the damping resistor is sufficiently high, the commutating capacitors can still be disconnected from the load in the intervals between the switching. But the voltage amplitude on the commutating capacitors cannot be stabilized by any known circuit arrangements, and this results in the appearance of an uncontrollable d.c. voltage component on the capacitors. The commutating capacitors, thyristors, and diodes are to be rated for higher voltage. This makes the equipment much more expensive, heavier, and bulky.

SUMMARY OF THE INVENTION

The invention is to provide an efficient and reliable autonomous inverter which is structurally uncomplicated due to lower maximum voltages applied to commutating capacitors and rectifiers of the inverter, which is achieved by stabilization of such voltages and prevention of the appearance of an uncontrollable direct component.

This object is achieved by an autonomous inverter comprising a three-phase thyristor bridge whose ac leads are connected, via commutating capacitors, to respective ac leads of a three-phase diode bridge whose dc leads are connected, via commutating thyristors, to the like dc leads of the thyristor bridge, a master oscilator, and a distributing unit, said master oscillator generating control pulses for the thyristor bridge and commutating thyristors, the output of the master oscillator being connected to a first input of the distributing unit whose outputs are connected to control junctions of the thyristors, according to the invention, additionally comprises a differential amplifer, a threshold element with a hysteresis characteristic, and two voltage dividers, first arms of said voltage dividers having three starconnected resistors whose leadouts are connected to ac leads of the thyristor and diode bridges respectively, resistors of the second voltage divider arms being inserted between the neutral points of said star-connections and the ground, the outputs of the voltage dividers being connected to inverting and non-inverting inputs of the differential amplifier whose output is connected, via the threshold element, to a second input of the distributing unit.

This circuit arrangement of the autonomous inverter prevents, while being structurally uncomplicated, the appearance of an uncontrollable direct component on the commutating capacitors, and stabilizes the amplitude of the voltage of the commutating capacitors, which is a guarantee of a high commutation stability in all operational conditions of the autonomous inverter. The power performance of the autonomous inverter are improved by reduction of the maximum voltages on the commutating capacitors and rectifier equipment. This also permits making the autonomous inverter cheaper, lighter, smaller, and more reliable.

BRIEF DESCRIPTION OF THE DRAWINGS

The invention will now be described in greater detail with reference to a specific embodiment thereof and accompanying drawings, wherein.

DESCRIPTION OF THE PREFERRED EMBODIMENTS

Figure 1:
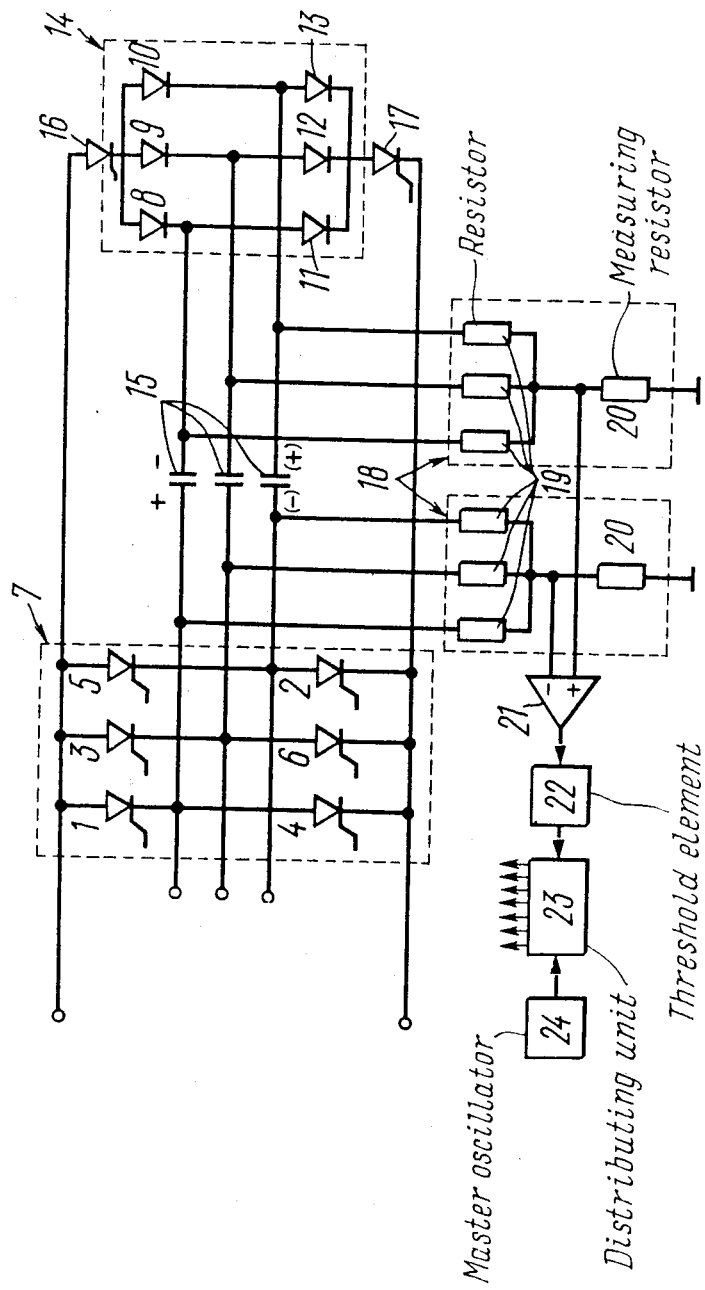
FIG. 1 shows a circuit diagram of an autonomous inverter, according to the invention.

Referring to FIG. 1, the autonomous inverter, according to the invention, comprises thyristors 1-6 forming a thyristor bridge 7, and diodes 8-13 forming a diode bridge 14. The ac leads of the thyristor bridge 7 are connected, via commutating capacitors 15, to respective leads of the diode bridge 14. The dc leads of this diode bridge 14 are connected to the like leads of the thyristor bridge 7 via commutating thyristors 16 and 17.

The voltage on the commutating capacitors 15 is measured by two voltage dividers 18, one arm of each such voltage divider 18 comprising three resistors 19 which are star-connected and coupled to ac leads of the bridges 7 and 14. Measuring resistors 20 of the voltage dividers 18 are inserted between the neutral points of the star connections of the resistors 19 and the ground. Outputs of the voltage dividers 18 are connected to inverting and non-inverting inputs of a differential amplifier 21 whose output is connected to an input of a threshold element 22 having a hysteresis characteristic and designed to detect the instant when the voltage across the commutating capacitors 15 reaches the desired level. The output of the threshold element 22 is connected to one of the inputs of a distributing unit 23 which allocates enabling pulses to control junctions of the thyristors 1-6, 16, and 17. Another input of the distributing unit 23 is connected to an output of a master oscillator 24.

The autonomous inverter, according to the invention, operates as follows.

Figure 2:
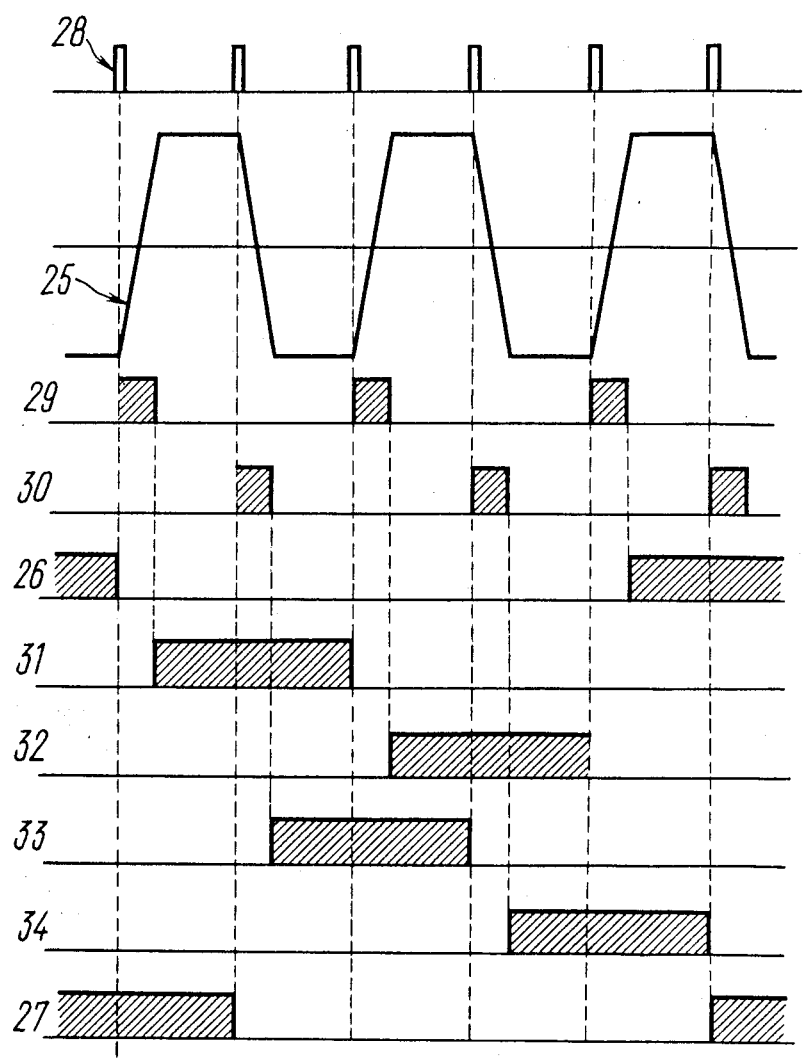
FIG. 2 shows time diagrams of the operation of an autonomous inverter.

For clarity, let us deal with the switching interval in which thyristors 1 and 2 of the bridge 7 are turned on. In this case, all other rectifier elements, both thyristors and diodes, are turned off. The commutating capacitors 15 are isolated from the load and charge due to previous commutation processes. The voltage polarity of these elements is shown in FIG. 1 without braces. This polarity corresponds to the low (negative) level of the output voltage across the voltage dividers 18 and at the output of the differential amplifier 21 (FIG. 2, plot 25). The hysteresis-type threshold element 22 (FIG. 1) is in one of its stable states, and, respectively, the distributing unit 23 generates control pulses for the thyristors 1 and 2 verifying they are turned on (FIG. 2, plots 26 and 27).

When the next pulse 28 (FIG. 2) of the master oscillator 24 (FIG. 1) arrives, the distributing unit 23 removes the control pulse from the thyristor 1 (FIG. 2, plot 26) and feeds a control pulse to the thyristor 16 (FIG. 2, plot 29). The control pulse for the thyristor 2 (FIG. 2, plot 27) is retained.

The thyristor 1 is turned off by the voltage applied from the commutating capacitor 15 (FIG. 1). The commutating capacitors 15 start recharging, via the thyristor 16, diodes 8, 9, and 10, and the load, to the polarity shown in braces in FIG. 1.

The output voltage of the voltage dividers 18 (FIG. 2, plot 25) and the amplifier 21 (FIG. 1) also changes along the ascending line in relation to the axis of the plot 25 (FIG. 2). The state of the threshold element 22 (FIG. 1) remains unchanged due to hysteresis until the voltage across the commutating capacitors 15 reaches the level determined by the setting of the threshold element 22 and its hysteresis (the top limiting line in relation to the axis of plot 25, FIG. 2). During the recharging period, the distributing unit 23 (FIG. 1) goes on generating control pulses for the thyristors 16 and 2.

When the commutating capacitors 15 recharge to the assigned level, the threshold element 22 operates and it is flipped to the other stable state. The distributing unit 23 stops feeding pulses to the thyristor 16 and turns on the next thyristor 3 of the anode group of the bridge 7 (FIG. 2, plots 30 and 31). The thyristor 16 (FIG. 1) and diodes 8, 9, and 10 are turned off by the voltage from the commutating capacitors 15. Then the next switching interval in the inverter operation starts, in which thyristors 3 and 2 of the bridge 7 are turned on. All other rectifier elements of the autonomous inverter are turned off, and the commutating capacitors 15 are isolated from the load. The length of the switching interval is determined by the operational periods of the master oscillator 24 or, in other words, by the output frequency of the inverter.

When a next pulse of the master oscillator 24 arrives, the distributing unit 23 removes the control pulse from the thyristor 2 and turns the thyristor 17 on. In this manner, the commutation process in the cathode group of rectifiers of the autonomous inverter is started, as has been described above (FIG. 2, plots 32, 33, and 34). This commutation process is terminated when the commutating capacitors 15 (FIG. 1) are recharged to the level corresponding to the lower limiting line in relation to the axis of the plot 25 (FIG. 2). This level is also determined by the setting of the threshold element 22 (FIG. 1) like in the previous commutation process.

To summarize, the maximum voltage levels of the commutating capacitors 15 are strictly fixed and are dependent on the adjustment of the threshold element 22. These levels correspond to real values of voltages of the commutating capacitors 15, since they are measured by dividers across the resistors 19 and 20 through which all components of these voltages, including the direct component, if any, are transmitted. In this manner the target is achieved—the voltage on the commutating capacitors is accurately stablized and the uncontrollable direct component is rejected.

More accurate stabilization of voltage in this autonomous inverter permits reduction of the maximum values of such voltages by 20-30%, while retaining high commutation stability of the inverter. Since voltages on the capacitors are brought down, thyristors and diodes of lower classes can be employed in the inverter. Moreover, the number of series connected thyristors and diodes in high-voltage circuits can also be cut down by 20-30%.

In the autonomous inverter, according to the invention, the threshold element 22 may be a regenerative comparator whose inverted output is formed by means of a logical inverter. The distributing unit 23 is a ring scaler built around triggers and AND gates. The master oscillator 24 and differential amplifier 21 have circuits known to all those skilled in the art.

To summarize, it can be safely assumed that the autonomous inverter, according to the invention, has several serious advantages over prior art devices. It is structurally uncomplicated and functionally reliable, and can be used in thyristor frequency changers for induction motors and electric drives. It is particularly effective in high-voltage thyristor frequency changers where reliability, low weight, and small size are decisive factors, all other things being equal.

This invention can be extensively used in thyristor frequency changers for adjustable electric drives featuring induction motors rated for various power and voltage.

We claim:

1. An autonomous inverter comprising a three-phase thyristor bridge whose ac leads are connected, via commutating capacitors, to respective ac leads of a three-phase diode bridge whose dc leads are connected to the like dc leads of the thyristor bridge via commutating thyristors, a master oscillator, and a distributing unit producing control pulses for the thyristor bridge and commutating thyristors, the output of said master oscillator being connected to a first input of said distributing unit whose outputs are connected to control junctions of said thyristors, characterized in that the autonomous inverter is additionally provided with a differential amplifier (21), a threshold element (22) of a hysteresis-type, and two voltage dividers (18), first arms of said voltage dividers (18) comprising three star-connected resistors (19) whose leads are connected to ac leads of said thyristor and diode bridges (7 and 14), respectively, while resistors (20) of second arms of the voltage dividers (18) are inserted between neutral points of said star connections and ground, outputs of said voltage dividers (18) being connected to inverting and non-inverting inputs of said differential amplifier (21) whose output is connected, via said threshold element (22), to a second input of said distributing unit (23).

* * * * *